US006532469B1

(12) United States Patent
Feldman et al.

(10) Patent No.: US 6,532,469 B1
(45) Date of Patent: Mar. 11, 2003

(54) DETERMINING TRENDS USING TEXT MINING

(75) Inventors: Ronen Feldman, Petach Tikva (IL); Yehonatan Aumann, Jerusalem (IL); Yaron Ben-Yehuda, Ramat Gan (IL); David Landau, Rehovot (IL)

(73) Assignee: ClearForest Corp., New York, NY (US)

( * ) Notice: Subject to any disclaimer, the term of this patent is extended or adjusted under 35 U.S.C. 154(b) by 0 days.

(21) Appl. No.: 09/399,618

(22) Filed: Sep. 20, 1999

(51) Int. Cl.[7] .............................................. G06F 17/30
(52) U.S. Cl. .................................................... 707/102
(58) Field of Search ............................. 707/2, 5, 6, 10, 707/103 R, 104.1, 102; 709/219

(56) References Cited

U.S. PATENT DOCUMENTS

| | | | |
|---|---|---|---|
| 5,634,051 A | | 5/1997 Thomson ........................ 707/5 |
| 6,029,195 A | * | 2/2000 Herz ............................ 705/14 |

OTHER PUBLICATIONS

Feldman, R. et al., "Visualization Techniques to Explore Data Mining Results for Document Collections", *Proceedings of the Third International Conference on Knowledge Discovery and Data Mining* (*1997*), pp. 17–23.

Lent, B. et al., "Discovering Trends in Text Databases", *Proceedings of the Third International Conference on Knowledge Discovery and Data Mining* (*1997*), pp. 227–230.

Feldman, R., "Trend Graphs: Visualizing the Evolution of Concept Relationships in Large Document Collections", *Proceedings of the Fourth International Conference on Knowledge Discovery and Data Mining* (*1998*).

Feldman, R. et al., "Text Mining at the Term Level", *Proceedings of the Fourth International Conference on Knowledge Discovery and Data Mining* (*1998*).

Feldman, R. et al., "Mining Text Using Keyword Distributions", *Proceedings of the First International Conference on Knowledge Discovery and Data Mining* (*1995*), pp. 1–23.

* cited by examiner

*Primary Examiner*—Diane D. Mizrahi
*Assistant Examiner*—Apu M Mofiz
(74) *Attorney, Agent, or Firm*—Pennie & Edmonds LLP (57) ABSTRACT

A method for visualizing variations in a corpus of information. The corpus includes a plurality of information entries, which are divided into a plurality of sub-groups according to a differentiating parameter of the entries. For each of the entries, characteristics of information contained therein are extracted and pairs of different characteristics that appear together in at least one of the entries are found. An occurrence value is determined for each of the pairs of characteristics in each sub-group in which both of the characteristics appear. The occurrence values of at least some of the pairs of characteristics for at least two of the sub-groups are compared, and an indication of the comparative occurrence values of the pairs is provided.

24 Claims, 7 Drawing Sheets

TREND GRAPH JAN-MAR 1996

DETERMINING TRENDS USING TEXT MINING

FIELD OF THE INVENTION

The present invention relates generally to knowledge discovery in collections of data, and specifically to text mining.

BACKGROUND OF THE INVENTION

In recent years, the volume of text documents available on computers and computer networks is growing rapidly. It is virtually impossible to read all the available documents containing information of importance on a given subject. In order to find desired information, search engines have been developed which provide a user with documents which mention selected words or terms. The user may use Boolean patterns with "and," "or" and "not" terms to more distinctly define the scope of the desired documents. However, the user cannot always define precisely which are the desired documents or keyword combinations. In addition, search engines do not provide an integrated picture of the distribution and impact of given terms in an entire corpus of documents.

Text mining is used to find hidden patterns in large textual collections. Text mining tools provide a human-tangible description of the information included in the textual collection. Because the amount of information is so large, a crucial feature of text mining tools is the way the information is organized and/or displayed. To limit the amount of information that a user must digest, it is common to define a context group which defines the information of interest to the particular user. Normally, the context group includes those documents which include one or more terms from a user-defined set.

A central tool in text mining is visualization of the complex patterns that are discovered. One such visualization approach is described, for example, in an article by Feldman R., Klosgen W., and Zilberstien A., entitled "visualization Techniques to Explore Data Mining Results for Document Collections," in *Proceedings of the 3rd International Conference on Knowledge Discovery and Data Mining* (1997), pp. 16–23, which is incorporated herein by reference. This article describes a concept relationship analysis in which a set of concepts (or terms) are searched for in a corpus of textual data formed of a plurality of documents. The concept relationship analysis searches for groups of concepts which appear together in relatively large numbers of documents, and these concepts are displayed together.

One method of representing concept relationships is by displaying context graphs. In context graphs, the concepts (or terms) which appear together in large numbers of documents are designated by nodes. Each two nodes are connected by an edge which has a weight which is equal to the number of documents in which the terms of both nodes appear together. In order to limit the amount of data displayed, only edges which have a weight above a predetermined threshold are displayed. In some context graphs, the concepts which appear in nodes are chosen from a list of interesting terms defined by the user.

In many cases, the corpus of documents is formed of several groups of documents, for example, documents from different dates, and it is desired to apprehend concept relationships as they develop in time. An article by Lent B., Agrawal R., and Srikant R., entitled "Discovering Trends in Text Databases," in *Proceedings of the 3rd International Conference of Knowledge Discovery and Data Mining* (1997), pp. 227–230, which is incorporated herein by reference, describes a method of detecting trends in textual collections formed of documents with timestamps, which are partitioned into time groups according to a selected granularity. The textual collection is mined for a group of combinations of words (referred to as phrases) which appear in the documents of the collection. Each combination is given frequency-of-occurrence values for each time group. A user requests to view the frequencies of occurrence of those combinations for which the occurrences follow a desired pattern. However, this method does not give the user any feel for the development of trends in the textual documents as a whole.

In an article entitled "Trend graphs: Visualizing the evolution of concept relationships in large document collections," by Feldman R., Aumann Y., Zilberstien A., and Ben-Yehuda Y., in *Proceedings of the 4th International Conference of Knowledge Discovery and Data Mining* (1998), which is incorporated herein by reference, a graphical tool is described for analyzing and visualizing dynamic changes in concept relationships over time.

SUMMARY OF THE INVENTION

It is an object of the present invention to provide methods and apparatus for displaying trends that are discovered in large collections of information.

In some aspects of the present invention, the trends relate to appearances of terms found by text mining in groups of documents.

It is another object of some aspects of the present invention to provide methods and apparatus for displaying the evolution of concept relationships in groups of documents.

It is another object of some aspects of the present invention to provide methods and apparatus for displaying differences between patterns of term appearances in different groups of documents.

It is still another object of some aspects of the present invention to provide methods and apparatus for determining major changes in patterns of term appearances in groups of documents.

In preferred embodiments of the present invention, a corpus of documents is divided into sub-groups defined by a differentiating parameter, such as the dates of the documents, or their origin. For each sub-group of documents, a separate context graph is prepared, and the relationship between the graphs is calculated.

In some preferred embodiments of the present invention, the differentiating parameter defines an order of the context graphs. The context graphs are preferably displayed sequentially, either one after another or one above the other. Each graph is preferably displayed with indications which show the differences between the present graph and the previous graph. Preferably, each edge in the graph is marked to indicate a difference between its weight in the present graph and its weight in the previous graph. Alternatively or additionally, each edge is marked to indicate the difference between its weight in the present graph and its average weight in a predetermined number of previous graphs.

Preferably, the edges are marked graphically, for example, using different colors, widths, and/or lengths to indicate the weight differences. In a preferred embodiment of the present invention, four indications are used for the following groups of edges: new edges, edges with increased weights, edges with decreased weights, and edges with substantially stable weights.

In some preferred embodiments of the present invention, the differentiating parameter is the date of the documents. Preferably, all the documents from a single period are considered to belong to a single sub-group. The periods may be of substantially any length, e.g., from minutes to years, according to a user selection. Alternatively or additionally, the differentiating parameter comprises the origins of the documents, such as the authors, editors, countries of origin or -the original languages of the documents. Further alternatively or additionally, substantially any other parameter may be used, such as the length of a document, or the average salary or number of employees of the company mentioned most frequently in a document.

In a preferred embodiment of the present invention, the context graphs are displayed such that all nodes that are common to two or more of the graphs appear in substantially the same relative locations in the graphs. Therefore, the layout of the displayed form of the context graphs is prepared after all the nodes of all the graphs are known. Alternatively, the locations of the nodes and/or the distances between the nodes are used to indicate the importance of the terms of the nodes. In such cases, animation techniques are preferably used to aid the user to follow the changes in the positions of the nodes.

In some preferred embodiments of the present invention, an animation sequence is used to display the changes between the context graphs. Alternatively or additionally, the context graphs are listed, for example, in a list box, and the user can choose which context graph should be displayed relative to which other graphs. Further alternatively or additionally, a plurality of context graphs are superimposed one over the other, and each graph is displayed using a different color.

In some preferred embodiments of the present invention, the corpus of documents includes a set of documents selected by a search engine, a clustering program, or by any other method of filtering and/or gathering of documents. Furthermore, the trend graphs produced in accordance with preferred embodiments of the present invention may be used to select groups of documents on which additional filtering and/or other processing is to be performed.

Although preferred embodiments are described herein with reference to mining and analysis of text documents, those skilled in the art will appreciate that the principles of the present invention may also be applied to visualization of trends and other variations in collections of information of other types. For example, trends occurring among the records in a large database may be analyzed and visualized in similar fashion.

There is therefore provided, in accordance with a preferred embodiment of the present invention, a method for visualizing variations in a corpus of information, including a plurality of information entries which are divided into a plurality of sub-groups according to a differentiating parameter of the entries, including:

for each of the entries, extracting characteristics of information contained therein;

finding pairs of different characteristics that appear together in at least one of the entries;

determining an occurrence value for each of the pairs of characteristics in each sub-group in which both of the characteristics appear;

comparing the occurrence values of at least some of the pairs of characteristics for at least two of the sub-groups; and providing an indication of the comparative occurrence values of the pairs.

Preferably, the entries include text documents, and the characteristics include terms appearing in the documents.

Further preferably, determining the occurrence value includes counting the number of entries in which the pair appears.

Still further preferably, finding the pairs of characteristics includes finding pairs of characteristics which appear together in at least a predetermined number of the entries.

In a preferred embodiment, finding the pairs of characteristics includes finding pairs of characteristics which appear together in at least two of the sub-groups.

Preferably, extracting the characteristics includes automatically mining the corpus to extract characteristics therefrom.

In a preferred embodiment, the differentiating parameter defines an order, and comparing the occurrence values includes comparing the occurrence values in a first sub-group with the occurrence values in one or more previous sub-groups in the order. Preferably, comparing the occurrence values includes comparing the occurrence values in the first sub-group with the occurrence values in a closest previous sub-group. Alternatively or additionally, comparing the occurrence values includes comparing the occurrence values in the first sub-group with an average of the occurrence values in the one or more previous sub-groups. Further alternatively or additionally, providing the indication includes displaying a symbol which indicates a measure of evolution in the occurrence value in the first sub-group relative to the occurrence values in the one or more previous sub-groups in the order.

In a preferred embodiment, providing the indication includes displaying a table or graph. Preferably, displaying the graph includes displaying a graph in which each term is represented by a node, the pairs of characteristics that are found are represented by edges, and substantially each edge is associated with the indication of the comparative appearance of the respective pair. Typically, displaying the graph includes displaying with substantially each edge a weight of the edge, which equals the occurrence value of the respective pair in a first sub-group. Alternatively or additionally, displaying the graph includes displaying the graph such that the lengths of the edges represent the occurrence value of the respective pair in a first sub-group.

In a preferred embodiment, displaying the graph includes displaying for each two sub-groups a graph which compares the occurrence values in the two sub-groups. Preferably, displaying the graph for each two sub-groups includes displaying the graphs such that nodes which represent the same term are displayed in substantially the same relative location. Further preferably, the graphs of each two sub-groups are displayed as an animation sequence.

Preferably, displaying the graph includes displaying a plurality of superimposed graphs, each of which represents the appearances of the pairs in a different sub-group. Further preferably, displaying the plurality of superimposed graphs includes displaying each of the graphs in a different color.

In a preferred embodiment, providing the indication of the comparative values of the pairs includes providing an indication wherein which pairs having a characteristic in common are grouped together.

There is also provided, in accordance with a preferred embodiment of the present invention, apparatus for visualizing variations in a corpus of information including a plurality of information entries which are divided into a plurality of sub-groups according to a differentiating parameter of the entries, including:

a processor which finds pairs of characteristics which appear together in at least one of the documents, determines an occurrence value for each of the pairs of characteristics in each sub-group in which both of the characteristics appear, and compares the occurrence values of at least some of the pairs of characteristics for at least two of the subgroups; and a display which displays an indication of the comparative occurrence values of the pairs.

In a preferred embodiment, the processor finds characteristics selected from a group of automatically determined characteristics.

There is further provided, in accordance with a preferred embodiment of the present invention, a method for selecting a range of values of a variable, including:

providing a graphic user interface on a display, including a slide-piece that has an initial dimension and is translatable along an axis representing the variable such that each position of the slide-piece along the axis corresponds to a given value of the variable;

positioning the slide-piece at a first position on the axis, so as to indicate a first value of the variable; and changing the dimension of the slide-piece so as to indicate a second value of the variable, whereby the first and second values of the variable define the selected range.

Preferably, changing the dimension of the slide-piece includes changing a length of the slide-piece along the axis. Further preferably, the first and second values of the variable include the extrema of the range.

There is still further provided, in accordance with a preferred embodiment of the present invention, a computer program product for visualizing variations in a corpus of information, including a plurality of information entries which are divided into a plurality of sub-groups according to a differentiating parameter of the entries, the documents including text, the program having computer-readable program instructions embodied therein, which instructions cause a computer to:

for each of the entries, extract characteristics of information contained therein;

find pairs of different characteristics that appear together in at least one of the entries;

determine an occurrence value for each of the pairs of characteristics in each sub-group in which both of the characteristics appear;

compare the occurrence values of at least some of the pairs of characteristics for at least two of the subgroups; and provide an indication of the comparative occurrence values of the pairs.

There is also provided, in accordance with a preferred embodiment of the present invention, a computer program product for selecting a range of values of a variable, the program having computer-readable program instructions embodied therein, which instructions cause a computer to:

provide a graphic user interface on a display, including a slide-piece that has an initial dimension. and is translatable along an axis representing the variable such that each position of the slide-piece along the axis corresponds to a given value of the variable;

position the slide-piece at a first position on the axis, so as to indicate a first value of the variable; and change the dimension of the slide-piece so as to indicate a second value of the variable, whereby the first and second values of the variable define the selected range.

There is additionally provided, in accordance with a preferred embodiment of the present invention, a method for extracting data from a corpus of information, including a plurality of information entries, each entry being assigned to one or more sub-groups according to a differentiating parameter of the entries, including:

for a first one of the entries in a first one of the sub-groups, extracting a characteristic of information contained therein;

for a second one of the entries in a second one of the sub-groups, extracting the same characteristic of information;

automatically determining respective first and second occurrence values corresponding to the characteristic in the first and second sub-groups; and providing an indication of the occurrence values.

Preferably, providing the indication includes providing a visual indication of the occurrence values. Further preferably, the differentiating parameter includes a sequence, most preferably a time sequence.

There is still additionally provided, in accordance with a preferred embodiment of the present invention, apparatus for extracting data from a corpus of information including a plurality of information entries, each entry being assigned to one or more sub-groups according to a differentiating parameter of the entries, including:

a processor, which (a) for a first one of the entries in a first one of the sub-groups, extracts a characteristic of information contained therein, (b) for a second one of the entries in a second one of the sub-groups, extracts the same characteristic of information, and (c) automatically determines respective first and second occurrence values corresponding to the characteristic in the first and second sub-groups; and a display, which provides an indication of the occurrence values.

There is yet additionally provided, in accordance with a preferred embodiment of the present invention, a computer program product for extracting data from a corpus of information, including a plurality of information entries, each entry being assigned to one or more sub-groups according to a differentiating parameter of the entries, the program having computer-readable program instructions embodied therein, which instructions, when read by a computer, cause the computer to:

for a first one of the entries in a first one of the sub-groups, extract a characteristic of information contained therein;

for a second one of the entries in a second one of the sub-groups, extract the same characteristic of information;

automatically determine respective first and second occurrence values corresponding to the characteristic in the first and second sub-groups; and provide an indication of the occurrence values.

The present invention will be more fully understood from the following detailed description of the preferred embodiments thereof, taken together with the drawings in which:

DETAILED DESCRIPTION OF PREFERRED EMBODIMENTS

Figure 1:
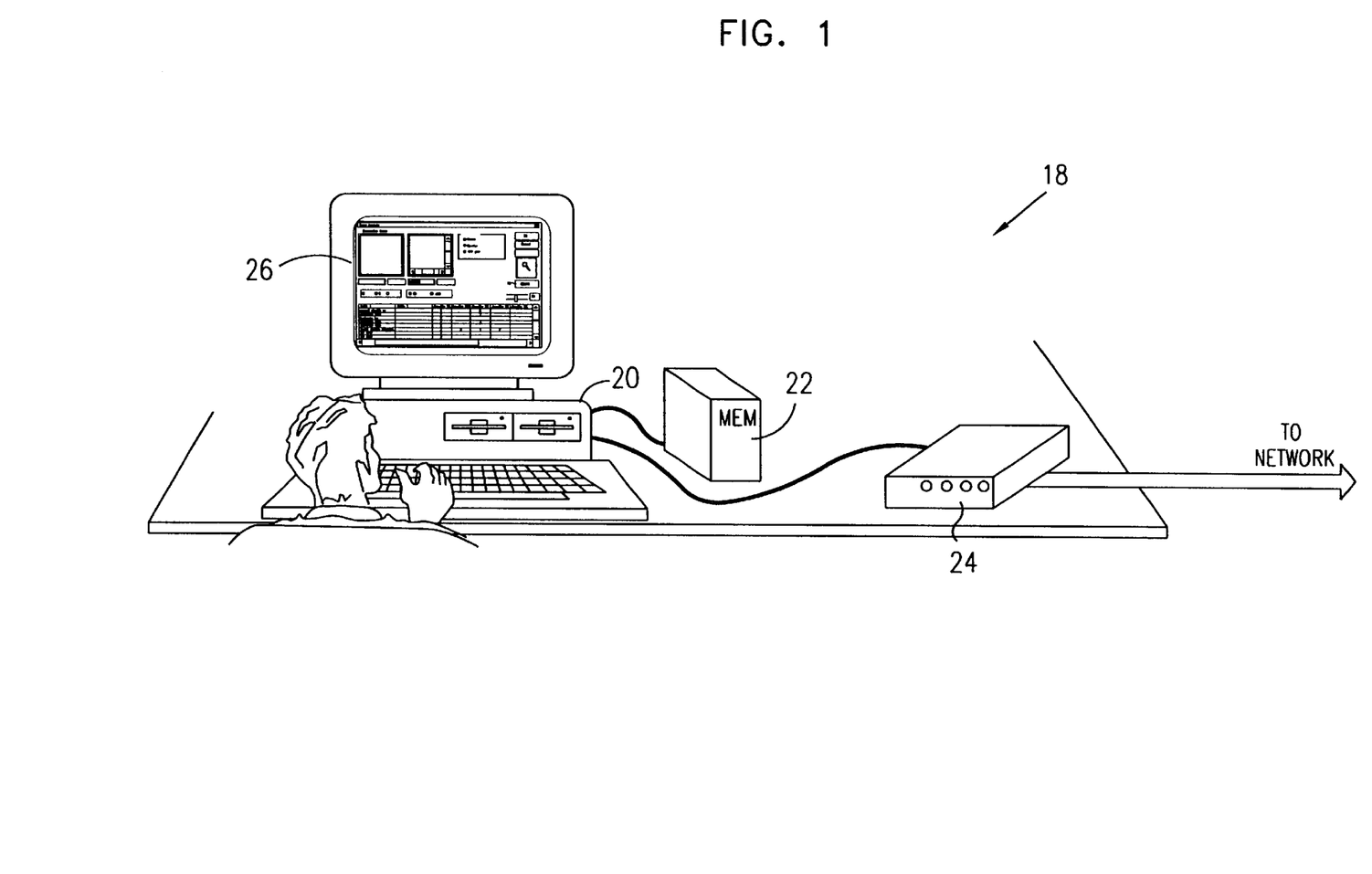
FIG. 1 is a schematic illustration of a system for text mining, in accordance with a preferred embodiment of the present invention.

FIG. 1 is a schematic illustration of a system 18 for text mining and visualization, in accordance with a preferred embodiment of the present invention. System 18 preferably comprises a memory 22, which stores a corpus of documents from which information is mined. Alternatively or additionally, system 18 comprises a modem 24 or other network connection, through which access is established to collections of documents, which include some or all of the documents in the corpus. System 18 preferably further comprises a computer 20, which mines information from the documents, and a display 26, on which the mined information is displayed.

Figure 2:
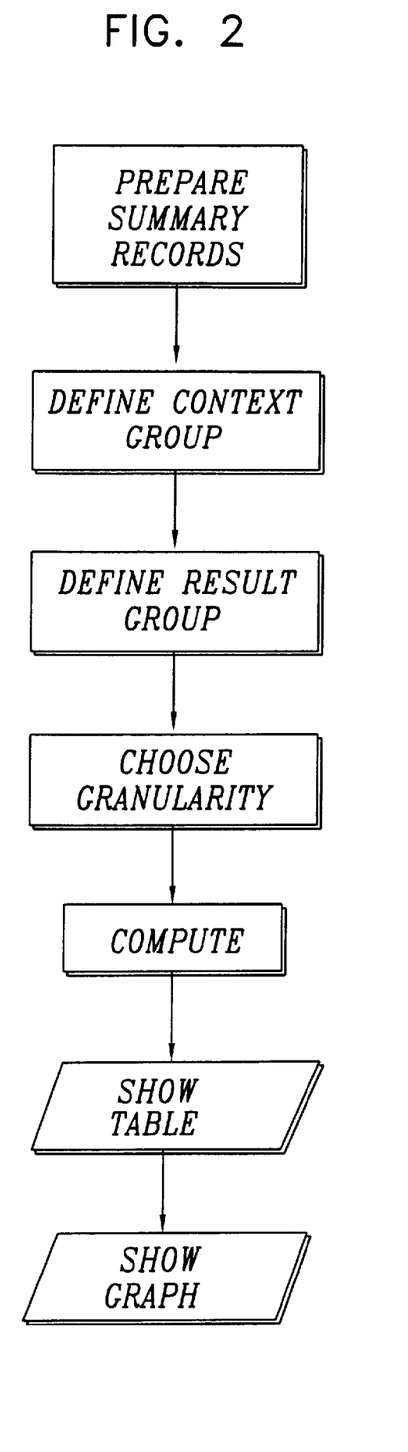
FIG. 2 is a flow chart illustrating preparation of a trend graph from a corpus of documents, in accordance with a preferred embodiment of the present invention.

FIG. 2 is a flow chart illustrating the actions of computer 20 in preparing trend graphs from the corpus of documents, in accordance with a preferred embodiment of the present invention. Preferably, the documents in the corpus are dated and/or time-stamped, and the trend graph represents changes in the corpus as a function of time. Alternatively or additionally, each document is associated with a different ordering parameter value, not necessarily time-related. For example, the corpus of documents may include articles drawn from The Wall Street Journal about high-tech companies, and the ordering parameter may be the average employee salary or the number of employees of the company mentioned most frequently in an article. In this example, a database containing information about employees of high-tech companies would preferably be accessible, either locally or remotely, to computer 20. Alternatively or additionally, a more complex ordering parameter, such as (average employee salary)*(percentage of employees who use a PC)*(percentage of employees who have a college degree), may be used to aid a user in analyzing a very large collection of news articles.

Preferably, computer 20 analyzes each document and prepares for each document a record which represents the document. The record preferably comprises a set of terms which appear in the document, most preferably together with the numbers of occurrences of the terms and/or a parameter which represents the importance of the terms. The records are preferably prepared in accordance with the method described in the article by Feldman, Klosgen, and Zilberstien, which is referenced in the Background of the Invention section of the present patent application. Alternatively or additionally, term extraction methods, term processing methods, and/or graphical display methods described in co-pending U.S. patent application Ser. No. 09/323,491, "Term-Level Text Mining with Taxonomies," filed Jun. 1, 1999, which is assigned to the assignee of the present patent application and is incorporated herein by reference, are used in implementing some embodiments of the present invention.

The records are preferably stored in memory 22 for future text mining, and computer 20 preferably does not need to access the documents again in order to perform additional text mining sessions.

Figure 3:
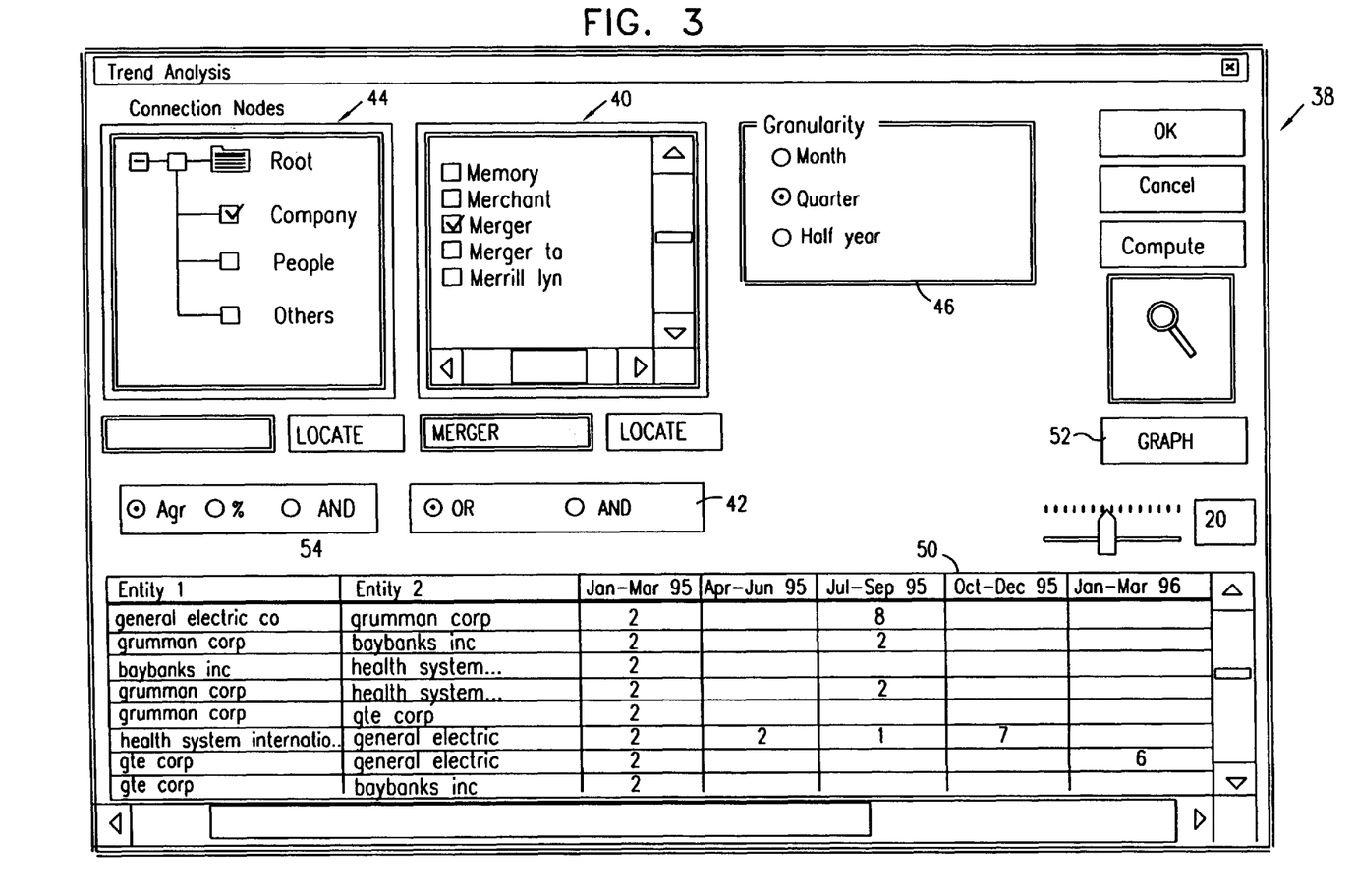
FIG. 3 is a schematic view of a text mining input window display, in accordance with a preferred embodiment of the present invention.

Reference is also made to FIG. 3, which is a schematic view of a text mining input window 38 on display 26, in accordance with a preferred embodiment of the present invention. In defining a text mining session, the user preferably defines a context group on which the session is performed. Preferably, the context group comprises those documents in which one or more selected terms appear in the accumulative or in the alternative, according to user selections. Input window 38 comprises a selection window 40 in which the user selects the terms to define the context group and a selection pad 42, for selecting Boolean operations to be performed on the terms.

Preferably, selection window 40 lists all the terms which appear in at least one of the documents of the corpus, and the user selects the terms form the list that will define the context group. Alternatively or additionally, the terms in selection window 40 are determined automatically, as described, for example, in an article by Feldman, et al., entitled "Text Mining at the Term Level," in Proceedings of the 4th International Conference on Knowledge Discovery and Data Mining (1998), which is incorporated herein by reference. In the example shown in FIG. 3, the context group is defined by terms associated with "merger." Alternatively or additionally, the user may define the context group using any other parameters characterizing the documents in the corpus, including the authorship, origin, length, and date of the documents.

Preferably, an additional selection window 44 enables the user to define types of terms that will be used in generating the context graphs. Ideally it would be desirable not to limit the terms appearing in the graphs. However, in most cases, such an unlimited approach would lead to an excess of meaningless data, for example, appearances of connection words ("and," "the," etc.), in the results. Therefore, window 44 allows the user to select the terms to appear in the results. Preferably, the terms appearing in the results are chosen according to predefined groups, such as companies, personal names, etc. Alternatively or additionally, the terms allowed to appear in the results may be chosen by excluding non-interesting terms.

The user preferably chooses in a window 46 a granularity for the time axis of the documents. The granularity defines the period of time from which all documents are considered to belong to a single group. The granularity may be on the order of months, as shown in FIG. 3, or on the order of hours, days, weeks or years, or substantially any time order.

After making appropriate selections, the user preferably actuates a compute button 48, which initiates the text mining. Computer 20 searches the records which represent the documents in the context group, in order to find documents in which pairs of two different terms from among the result terms of window 44 both appear. For each pair of terms, computer 20 counts separately for each period of time the number of documents in which the pair appears. Alternatively or additionally, computer 20 assigns each pair of terms an occurrence frequency value which is based on the number of documents in which the pair appears, the number of time each of the terms appears in the documents, and/or a weight given to each term according to its importance. The search is preferably performed as described in the above-mentioned article of Feldman, Klosgen and Zilberstien. Preferably, the results are shown in a table 50, in which two columns 54 show the pairs of terms, and the rest of the columns show the number of documents for each time period.

Preferably, the rows in table 50 are sorted such that pairs which include common terms appear next to each other. Alternatively, the rows in table 50 are sorted according to the total number of documents in which the respective pairs of terms appear. Further alternatively, the rows in table 50 are sorted according to the appearance of the term pairs in a selected period, i.e., in a column or group of columns in the table. Preferably, only pairs of terms with a relatively high number of appearances are displayed in table 50, and only a predetermined number of pairs of terms are displayed. Alternatively, all pairs which have a number of occurrences above a predefined threshold are displayed. Preferably, a button 52 allows the user to see the results in table 50 in a graphic format, as described hereinbelow.

Figure 4A:
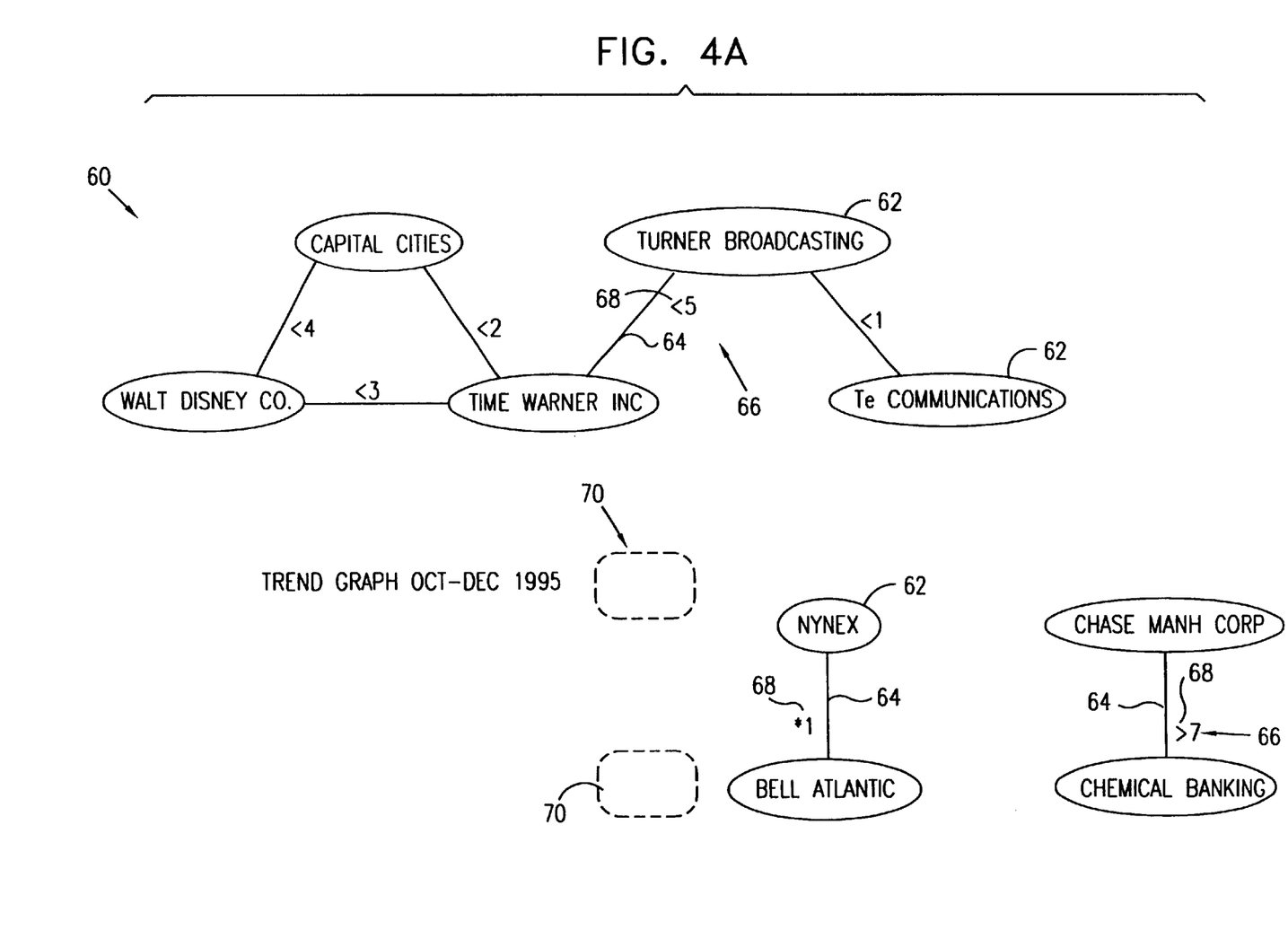
FIG. 4A is a schematic view of a trend graph, in accordance with a preferred embodiment of the present invention.

FIG. 4A is a schematic view of a trend graph 60, in accordance with a preferred embodiment of the present invention. Graph 60 preferably represents a single column of table 50, i.e., a single period. Rows of table 50 in which the entry of graph 60 in the single column has a value above a predetermined threshold are referred to herein as active rows. Each term which appears in one the first two columns 54 of an active row is shown by a node 62 in graph 60. Each of the active rows appears as an edge 64 in graph 60. Alternatively or additionally, other rows of table 50 in which the entry at the column of graph 60 is non-zero are also considered active rows, to be represented by an edge, provided they had a value above the threshold in a previous column of table 50, typically corresponding to a preceding period. Preferably, each edge 64 is displayed along with a weight 66 which is equal to the number of documents in which the pair of terms connected by the edge appears.

Further preferably, a symbol 68 is displayed next to weight 66 designating the change in the value of the weight relative to the previous column. Alternatively, the symbol designates the change relative to an average of a number of preceding columns. For example, symbol 68 is a "<" if the weight of its edge decreased, a ">" if the weight increased, and a "*" if the weight remains substantially stable. Preferably, weights are considered to increase or decrease only if the change is larger than a predetermined factor, for example, 25%. Edges which change by a factor smaller than the predetermined factor are considered stable. Preferably, new edges and/or edges with increased weights are designated by wider lines than edges which have decreased weights. Alternatively or additionally, other sets of symbols may be used to indicate the changes in the graphs.

Figure 4B:
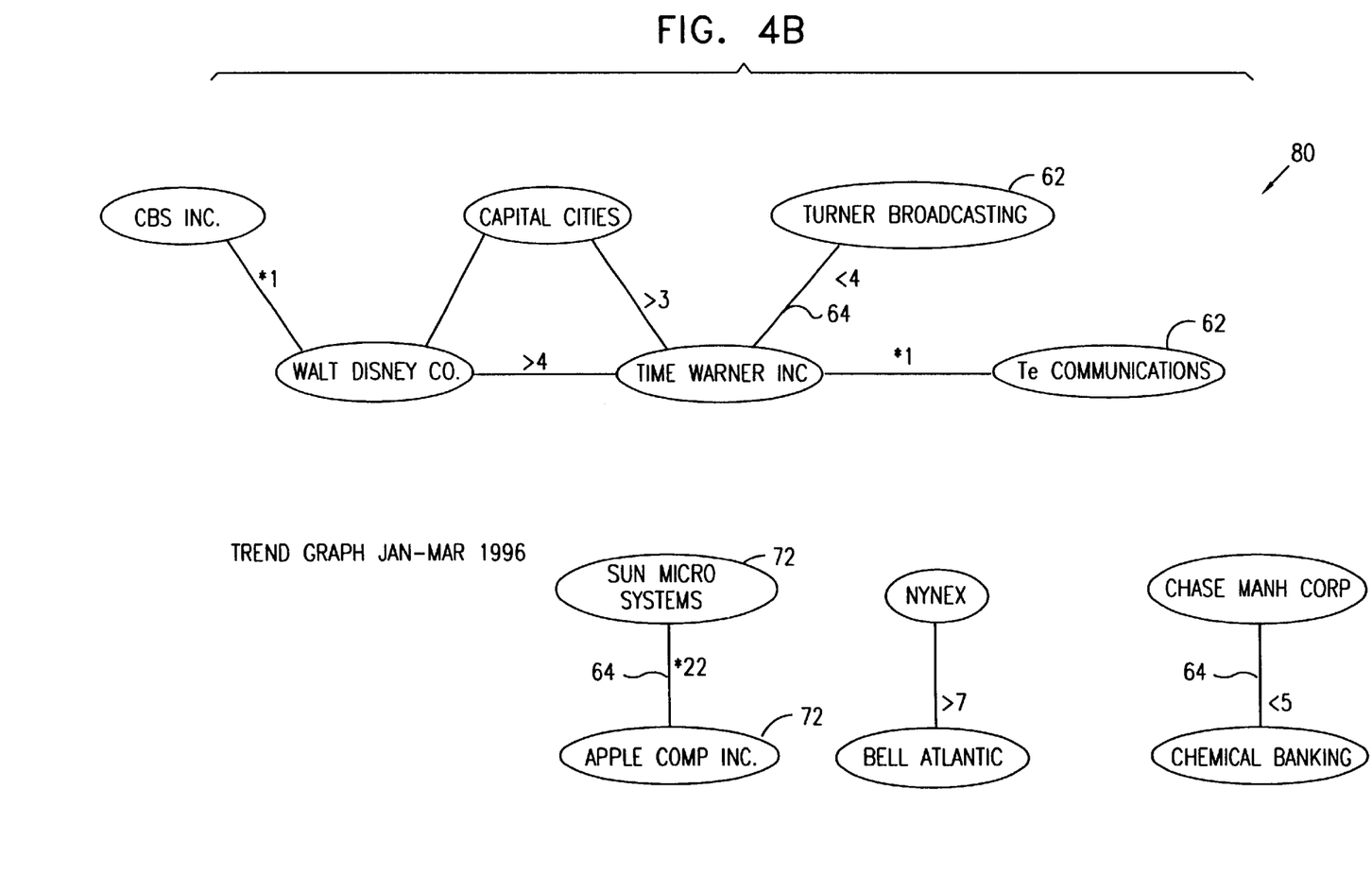
FIG. 4B is a schematic view of a trend graph representing a period following the period represented by the graph of FIG. 4A, in accordance with a preferred embodiment of the present invention.

FIG. 4B is a schematic view of a trend graph 80 representing a period following the period represented by graph 60, in accordance with a preferred embodiment of the present invention. Preferably, nodes 62 which appear in both graph 60 and 80 are positioned in the same locations in both graphs. Therefore, space is allocated for the nodes that will appear in the graphs representing all the columns of table 50, before displaying any of the graphs. For example, empty space 70 is left in graph 60, to leave room for nodes 72 in graph 80. Thus, it is easy to follow the similarities and changes in the graphs as they are displayed, for example, when successive graphs are displayed in sequence or in pseudo-3D geometrical superposition.

Alternatively, the positions of nodes 62 are chosen separately for each graph, arbitrarily or according to the weights of the edges 64 incident on the nodes. For example, nodes 62 having relatively higher sums of weights of the incident edges may be positioned in the center or at the top of the graph. Further alternatively or additionally, the lengths of edges 64 may be used to indicate a desired parameter. For example, the length of the edge may indicate the weight of the edge, while the thickness of the edge indicates its weight relative to one or more previous periods.

Preferably, the user can request more information by selecting areas of the graph. For example, when the user double-clicks on one of edges 64, a window may open with a bar graph, a table or any other indication which shows the weights of the edge as a function of time. Alternatively or additionally, the documents contributing to the selected edge may be listed, allowing the user to read the documents and judge their relevance. Further preferably, the user may request to see the graphs as they change over time in an animation sequence.

Figure 5:
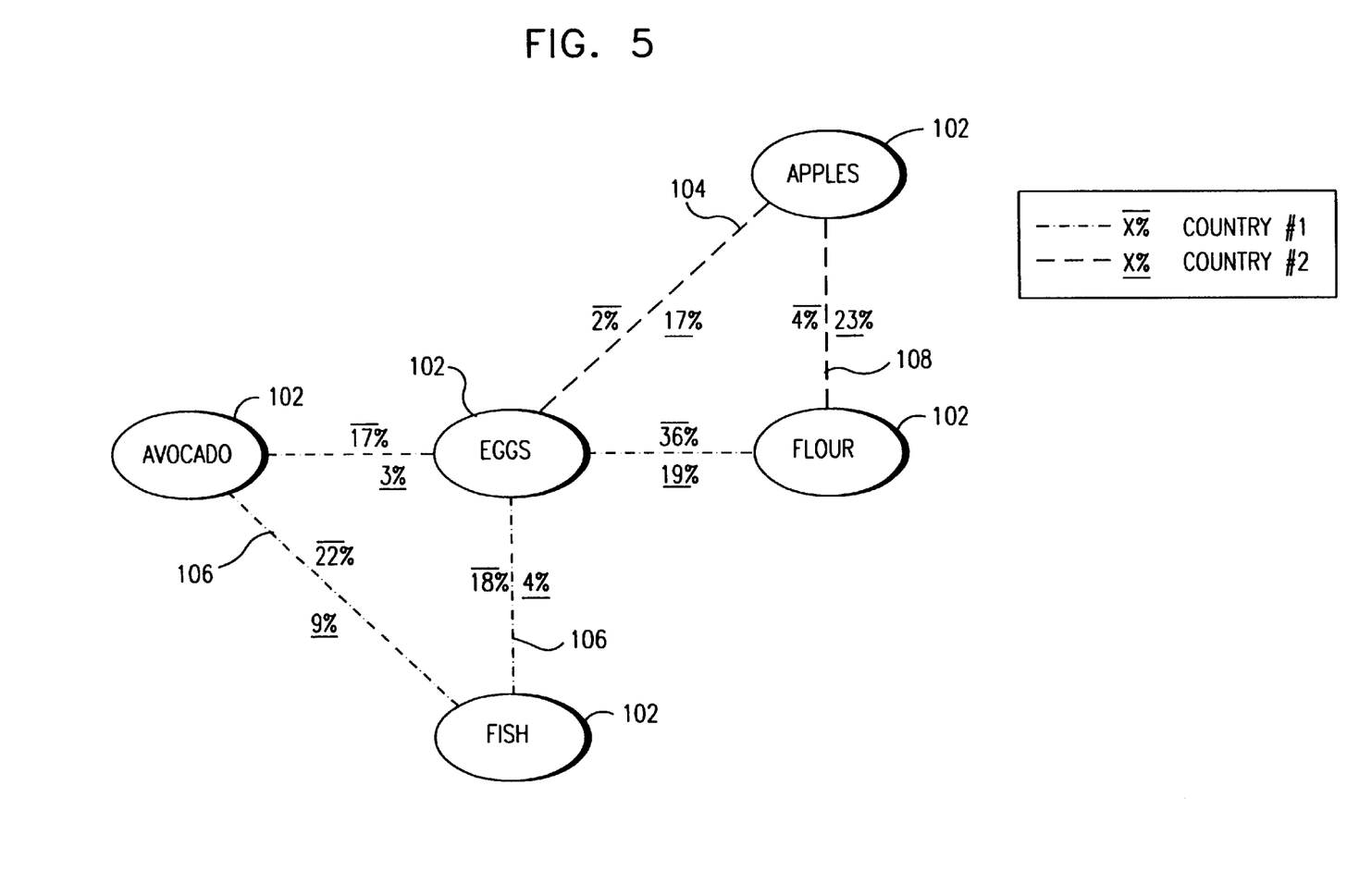
FIG. 5 is a schematic view of a comparison graph, in accordance with a preferred embodiment of the present invention.

FIG. 5 is a schematic view of a comparison graph 100, in accordance with a preferred embodiment of the present invention. Graph 100 compares text mining results of recipe documents from different document groups, for example, documents from two different countries. Each major ingredient in the recipes is designated by a node 102. Nodes 102 which appear together in more than a predetermined threshold number of documents are connected by an edge 104. Each edge is marked with two values, corresponding to appearance of the associated terms in documents from the two different countries. Preferably, the values indicate the percentage of documents from the respective country in which the pair of ingredients connected by the corresponding edge 104 both appear. Alternatively or additionally, the edges 104 are marked with the absolute number of documents. Preferably, edges 106 which correspond to combinations that are more popular in country #1 are displayed differently from edges 108 for combinations which are more popular in country #2.

Alternatively or additionally, the edges and values for each country may be displayed in different colors. Thus, it is possible to compare documents from more than two groups. Further alternatively or additionally, only a single value designating the difference between the values of different document groups is displayed with each edge. Preferably, the user may select which type of display is desired.

Figure 6:
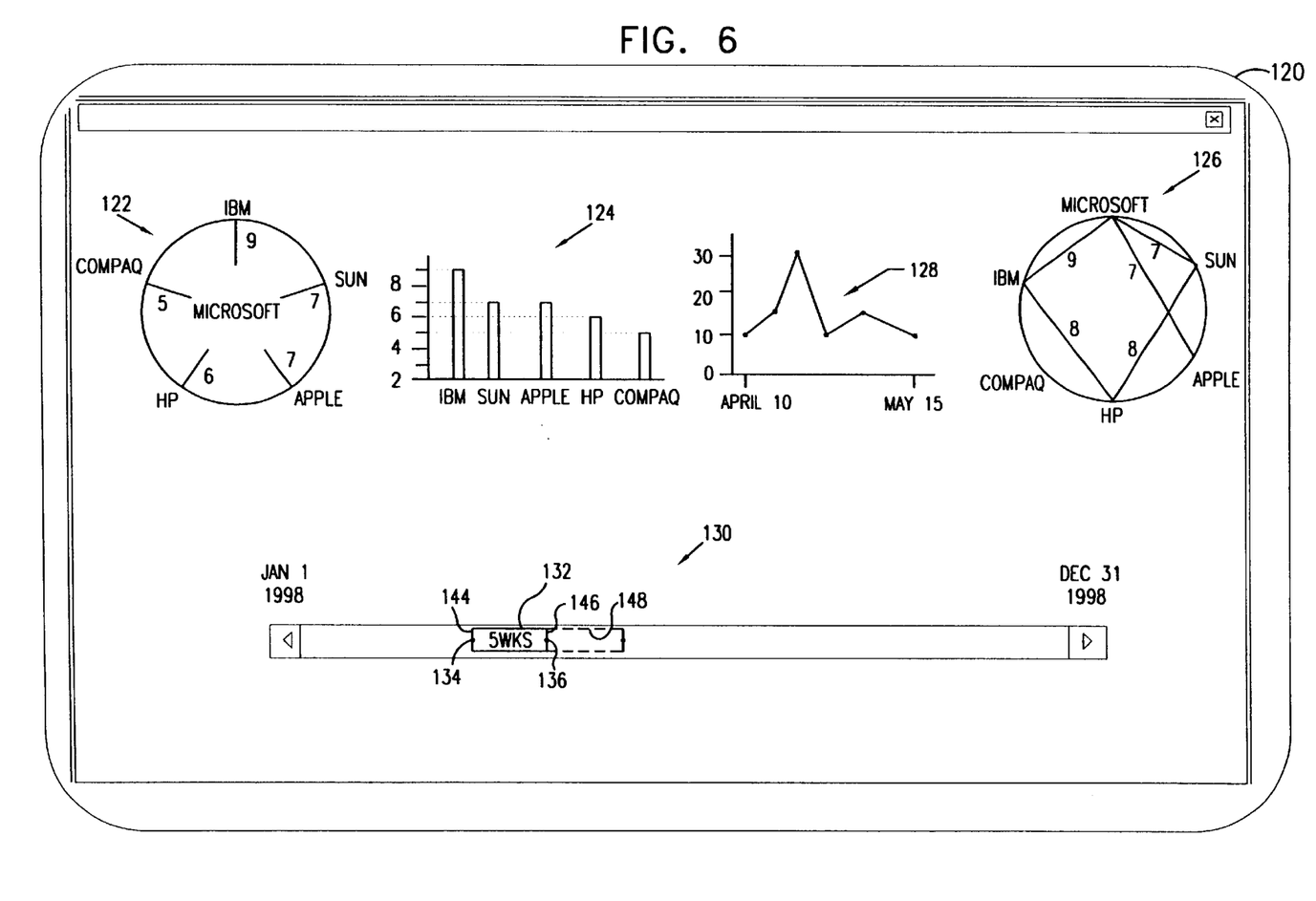
FIG. 6 is a schematic view of a graphic interface, in accordance with a preferred embodiment of the present invention.

FIG. 6 is a schematic view of a graphic interface 120, showing-sample graphs 122, 124, 126, and 128, for displaying results generated in part using some of the techniques described hereinabove, in accordance with a preferred embodiment of the present invention. Graphs 122 and 124 are, respectively, a "single-term"-centered graph and a bar graph, in which the relationship between a single term ("Microsoft") and a set of other terms ("IBM," Sun," etc.) is quantitatively displayed. The quantitative relationship shown in graphs 122 and 124 may comprise, for example, the number of news articles containing both the term "Microsoft" and each of the other listed terms during a specified time period. Using the same analysis as that which generated graphs 122 and 124, graph 126 is displayed to show the most significant relationships among all of the displayed terms. By contrast, graph 128 shows the number of appearances of the term "Microsoft," irrespective of the other companies, during a five week period extending from April 10 to May 15.

Preferably, a slide-bar 130 is provided with interface 120, which enables the user to move an enhanced slide-piece 132 between two points on an axis of interest, e.g., time. Slide-bars which perform this limited function are widely available, for example, in Microsoft Windows 98. In prior art slide-bars, the slide-piece is typically moved to indicate, for example, a location in a document, a time, or a color from a range of pages, times, or colors, respectively.

In this embodiment, the length of enhanced slide-piece 132, i.e., the distance between points 134 and 136 in FIG. 6, provides the user with additional information about a parameter of interest. For example, slide-bar 130 in the embodiment shown in FIG. 6 represents a set of relevant news articles spanning one year. The length of enhanced slide-piece 132, as shown, is five weeks, i.e., approximately one tenth the total length of slide-bar 130. Preferably, as the user moves the enhanced slide-piece along the slide-bar, graphs 122, 124, and 126 are continually updated responsive to whatever news articles are contained in a five-week period which is "covered" by the slide-piece.

Further preferably, and completely unlike any slide-bar known in the art, the user is enabled to modify the length of the enhanced slide-piece in real time, so as to cause computer 20 to change the set of articles used in generating the graphs accordingly. For example, dashed lines 148 show a former setting of the slide-piece, in which approximately twelve weeks were represented by the slide-piece. Preferably, the user uses a mouse to grab onto the left side 144 or right side 146 of enhanced slide-piece 132, and changes its length, typically in a manner analogous to the way objects are re-sized in a Windows environment. Notably, however, neither Windows nor any other software provides the improved and intuitive position control provided by enhanced slide-piece 132.

In light of this description of the operation of slide-piece 132, many applications not related to a time axis will become obvious to one skilled in the art. For example, scrolling through a document by moving slide-piece 132 could be enhanced by a "zoom" feature, effectively enabled by changing the size of the slide-piece. Alternatively, whereas a slide-bar which uses prior art technology would allow the user to select a single color from a spectrum, a user of embodiments of the present invention would be additionally enabled to select a range of neighboring colors in an intuitive fashion.

It will be understood by one skilled in the art that aspects of the present invention described hereinabove can be embodied in a computer running software, and that the software can be stored in tangible media, e.g., hard disks, floppy disks or compact disks, or in intangible media, e.g., in an electronic memory, or on a network such as the Internet. It will be appreciated that the individual preferred embodiments described above are cited by way of example, and that specific applications of the present invention may employ only a portion of the features described hereinabove, or a combination of features described with reference to a plurality of the figures. The full scope of the invention is limited only by the claims.

What is claimed is:

1. A method for visualizing variations in a corpus of information, including a plurality of information entries which are divided into a plurality of sub-groups according to a differentiating parameter of the entries, comprising:

for each of the entries, extracting characteristics of information contained therein;

finding pairs of different characteristics that appear together in at least one of the entries;

determining an occurrence value for each of the pairs of characteristics in each sub-group in which both of the characteristics appear;

comparing the occurrence values of at least some of the pairs of characteristics for at least two of the sub-groups; and providing an indication of the comparative occurrence values of the pairs;

wherein the differentiating parameter defines an order, and wherein comparing the occurrence values comprises comparing the occurrence values in a first sub-group with the occurrence values in one or more previous sub-groups in the order.

2. A method according to claim 1, wherein comparing the occurrence values comprises comparing the occurrence values in the first sub-group with the occurrence values in a closest previous sub-group.

3. A method according to claim 1, wherein comparing the occurrence values comprises comparing the occurrence values in the first sub-group with an average of the occurrence values in the one or more previous sub-groups.

4. A method according to claim 1, wherein providing indication comprises displaying a symbol which indicates a measure of evolution in the occurrence value in the first sub-group relative to the occurrence values in the one or more previous sub-groups in the order.

5. A method for visualizing variations in a corpus of information, including a plurality of information entries which are divided into a plurality of sub-groups according to a differentiating parameter of the entries, comprising:

for each of the entries, extracting characteristics of information contained therein;

finding pairs of different characteristics that appear together in at least one of the entries;

determining an occurrence value for each of the pairs of characteristics in each sub-group in which both of the characteristics appear;

comparing the occurrence values of at least some of the pairs of characteristics for at least two of the sub-groups; and providing an indication of the comparative occurrence values of the pairs;

wherein providing the indication comprises displaying a graph, wherein displaying the graph comprises displaying a graph in which each term is represented by a node, the pairs of characteristics that are found are represented by edges, and substantially each edge is associated with the indication of the comparative appearance of the respective pair.

6. A method according to claim 5, wherein displaying the graph comprises displaying with substantially each edge a weight of the edge, which equals the occurrence value of the respective pair in a first sub-group.

7. A method according to claim 5, wherein displaying the graph comprises displaying the graph such that the lengths of the edges represent the occurrence value of the respective pair in a first sub-group.

8. A method for visualizing variations in a corpus of information, including a plurality of information entries which are divided into a plurality of sub-groups according to a differentiating parameter of the entries, comprising:

for each of the entries, extracting characteristics of information contained therein;

finding pairs of different characteristics that appear together in at least one of the entries;

determining an occurrence value for each of the pairs of characteristics in each sub-group in which both of the characteristics appear;

comparing the occurrence values of at least some of the pairs of characteristics for at least two of the sub-groups; and providing an indication of the comparative occurrence values of the pairs;

wherein providing the indication comprises displaying a graph, wherein displaying the graph comprises displaying for each two-sub-groups a graph which compares the occurrence values in the two sub-groups, wherein the graphs of each two sub-groups are displayed as an animation sequence.

9. A method for visualizing variations in a corpus of information, including a plurality of information entries which are divided into a plurality of sub-groups according to a differentiating parameter of the entries, comprising:

for each of the entries, extracting characteristics of information contained therein;

finding pairs of different characteristics that appear together in at least one of the entries;

determining an occurrence value for each of the pairs of characteristics in each sub-group in which both of the characteristics appear;

comparing the occurrence values of at least some of the pairs of characteristics for at least two of the sub-groups; and providing an indication of the comparative occurrence values of the pairs;

wherein providing the indication comprises displaying a graph, wherein displaying the graph comprises displaying a plurality of superimposed graphs, each of which represents the appearance of the pairs in a different sub-group.

10. A method according to claim 9, wherein displaying the plurality of superimposed graphs comprises displaying each of the graphs in a different color.

11. Apparatus for visualizing variations in a corpus of information including a plurality of information entries which are divided into a plurality of sub-groups according to a differentiating parameter of the entries, comprising:

a processor which finds pairs of characteristics which appear together in at least one of the documents, determines an occurrence value for each of the pairs of characteristics in each sub-group in which both of the characteristics appear, and compares the occurrence values of at least some of the pairs of characteristics for at least two of the sub-groups; and a display which displays an indication of the comparative occurrence values of the pairs;

wherein the differentiating parameter defines an order, and wherein the processor compares the occurrence values in a first sub-group with the occurrence values in one or more previous sub-groups in the order.

12. Apparatus according to claim 11, wherein the processor compares the occurrence values in the first sub-group with the occurrence values in a closest previous sub-group.

13. Apparatus according to claim 11, wherein the processor compares the occurrence values in the first sub-group with an average of the occurrence values in the one or more previous sub-groups.

14. Apparatus according to claim 11, wherein the display displays a symbol which indicates a measure of evolution in the occurrence values in the first sub-group relative to the occurrence values in the one or more previous sub-groups in the order.

15. Apparatus for visualizing variations in a corpus of information including a plurality of information entries which are divided into a plurality of sub-groups according to a differentiating parameter of the entries, comprising:

a processor which finds pairs of characteristics which appear together in at least one of the documents, determines an occurrence value for each of the pairs of characteristics in each sub-group in which both of the characteristics appear, and compares the occurrence values of at least some of the pairs of characteristics for at least two of the sub-groups; and a display which displays an indication of the comparative occurrence values of the pairs;

wherein the display displays a graph, wherein each node in the graph represents a term and each edge represents a found pair of characteristics, and substantially each edge is associated with the indication of the comparative appearance of the respective pair.

16. Apparatus according to claim 15, wherein the graph comprises with substantially each edge a weight of the edge which equals the occurrence value of the respective pair in a first sub-group.

17. Apparatus according to claim 15, wherein the graph comprises a graph in which the lengths of the edges represent the occurrence values of the respective pairs in a first sub-group.

18. Apparatus for visualizing variations in a corpus of information including a plurality of information entries which are divided into a plurality of sub-groups according to a differentiating parameter of the entries, comprising:

a processor which finds pairs of characteristics which appear together in at least one of the documents, determines an occurrence value for each of the pairs of characteristics in each sub-group in which both of the characteristics appear, and compares the occurrence values of at least some of the pairs of characteristics for at least two of the sub-groups; and a display which displays an indication of the comparative occurrence values of the pairs;

wherein the display displays a graph; said graph comprises a plurality of graphs each of which compares the occurrence values of the pairs in two sub-groups, wherein the plurality of graphs are displayed as an animation sequence.

19. Apparatus for visualizing variations in a corpus of information including a plurality of information entries which are divided into a plurality of sub-groups according to a differentiating parameter of the entries, comprising:

a processor which finds pairs of characteristics which appear together in at least one of the documents, determines an occurrence value for each of the pairs of characteristics in each sub-group in which both of the characteristics appear, and compares the occurrence values of at least some of the pairs of characteristics for at least two of the sub-groups; and a display which displays an indication of the comparative occurrence values of the pairs;

wherein the display displays a graph, the graph comprises a plurality of superimposed graphs each of which represents the occurrence values of the pairs in a different sub-group.

20. Apparatus according to claim 19, wherein the plurality of superimposed graphs comprise a plurality of superimposed graphs in which each of the graphs is displayed in a different color.

21. A method for selecting a range of values of a variable, comprising:

providing a graphic user interface on a display, including a slide-piece that has an initial dimension and is translatable along an axis representing the variable such that each position of the slide-piece along the axis corresponds to a given value of the variable;

positioning the slide-piece at a first position on the axis, so as to indicate a first value of the variable; and changing the dimension of the slide-piece so as to indicate a second value of the variable, whereby the first and second values of the variable define the selected range.

22. A method according to claim 21, wherein changing the dimension of the slide-piece comprises changing a length of the slide-piece along the axis.

23. A method according to claim 21, wherein the first and second values of the variable comprise the extrema of the range.

24. A computer program product for selecting a range of values of a variable, the program having computer-readable program instructions embodied therein, which instructions, when read by a computer, cause the computer to:

provide a graphic user interface on a display, including a slide-piece that has an initial dimension and is translatable along an axis representing the variable such that each position of the slide-piece along the axis corresponds to a given value of the variable;

position the slide-piece at a first position on the axis, so as to indicate a first value of the variable; and change the dimension of the slide-piece so as to indicate a second value of the variable, whereby the first and second values of the variable define the selected range.

* * * * *

UNITED STATES PATENT AND TRADEMARK OFFICE
CERTIFICATE OF CORRECTION

PATENT NO.     : 6,532,469 B1                                                   Page 1 of 1
DATED          : March 11, 2003
INVENTOR(S)    : Ronen Feldman et al.

It is certified that error appears in the above-identified patent and that said Letters Patent is hereby corrected as shown below:

<u>Title page,</u>
Item [73], Assignee, should read as -- ClearForest, Ltd., Petach Kikva, Isreal --

Signed and Sealed this

Nineteenth Day of August, 2003

JAMES E. ROGAN
*Director of the United States Patent and Trademark Office*